United States Patent
Iwasaki et al.

(10) Patent No.: US 6,490,226 B2
(45) Date of Patent: Dec. 3, 2002

(54) ULTRASONIC SONAR AND METHOD USING TRANSMISSION FREQUENCY DIFFERENT FROM REVERBERATION FREQUENCY

(75) Inventors: Nobuyuki Iwasaki, Nishio (JP); Hiroyuki Kani, Nishio (JP); Takeo Tsuzuki, Toyota (JP); Tanemichi Chiba, Nukata-gun (JP); Fumio Asakura, Okazaki (JP)

(73) Assignee: Nippon Soken, Inc., Nishio (JP)

( * ) Notice: Subject to any disclaimer, the term of this patent is extended or adjusted under 35 U.S.C. 154(b) by 0 days.

(21) Appl. No.: 09/767,751

(22) Filed: Jan. 24, 2001

(65) Prior Publication Data

US 2001/0012238 A1 Aug. 9, 2001

(30) Foreign Application Priority Data

Feb. 4, 2000 (JP) ........................ 2000-028193

(51) Int. Cl.⁷ ............................................. G01S 15/10
(52) U.S. Cl. ......................................... 367/97; 367/99
(58) Field of Search ....................... 367/99, 13, 97; 73/597

(56) References Cited

U.S. PATENT DOCUMENTS

| | | | |
|---|---|---|---|
| 3,783,258 A | | 1/1974 | Chwastyk |
| 4,132,117 A | * | 1/1979 | Primbsch .................. 73/600 |
| 5,277,065 A | * | 1/1994 | Leszczynski ............. 367/903 |
| 5,319,611 A | | 6/1994 | Korba |
| 5,991,234 A | * | 11/1999 | Sejalon et al. ............. 367/13 |

FOREIGN PATENT DOCUMENTS

| | | |
|---|---|---|
| DE | 41 38 328 A1 | 5/1992 |
| JP | 63-11882 | 1/1988 |
| JP | 9-297172 | 11/1997 |
| JP | 10-268035 | 10/1998 |
| JP | A 10-268035 | 10/1998 |
| WO | WO 90/08966 | 8/1990 |

* cited by examiner

Primary Examiner—Daniel T. Pihulic
(74) Attorney, Agent, or Firm—Law Offices of David G. Posz

(57) ABSTRACT

An ultrasonic sonar has a transceiver equipped with an ultrasonic oscillator. An ultrasonic wave is transmitted from the transceiver. The ultrasonic wave reflected from an obstacle is received by the ultrasonic oscillator to detect the obstacle. The transmission frequency of the ultrasonic wave is set to be different from the reverberation frequency. When the obstacle is detected, a microcomputer converts the analog signal received by the ultrasonic oscillator into a digital signal, performs a frequency transform of this signal by Fourier transform to extract only the transmission frequency component, and performs an inverse transform.

14 Claims, 15 Drawing Sheets

ULTRASONIC SONAR AND METHOD USING TRANSMISSION FREQUENCY DIFFERENT FROM REVERBERATION FREQUENCY

CROSS REFERENCE TO RELATED APPLICATION

This application is based on and incorporates herein by reference Japanese Patent Application No. 2000-28193 filed Feb. 4, 2000.

BACKGROUND OF THE INVENTION

The present invention relates to an ultrasonic sonar for detecting the presence of an obstacle by transmitting an ultrasonic wave and receiving a wave reflected from the obstacle and for calculating the distance to the obstacle.

Ultrasonic sonars used for vehicles are known as back sonars and as corner sonars. Such a vehicular sonar generally comprises an ultrasonic transceiver (transmitter and receiver using an ultrasonic oscillator) mounted in a bumper of a vehicle. This transceiver transmits pulses of an ultrasonic wave and receives the echo pulses from an obstacle. The travel time of the ultrasonic wave is measured, and the distance to the obstacle is calculated from the measured time.

More specifically, the envelope of the echo wave is detected. If the detected envelope exceeds a certain threshold level, it is determined that there is an obstacle. Then, the distance to the obstacle is calculated from the duration between the instant when the ultrasonic wave is transmitted and the instant when the threshold level is exceeded. The sonar informs the driver of the presence of an obstacle according to the result of the calculation of the distance. That is, when the vehicle parks or makes a turn, the possibility of contact with an obstacle is detected. Then, the sonar warns a vehicle driver to avoid possible collision with the obstacle.

The ultrasonic sonar comprises a single ultrasonic oscillator that transmits and receives an ultrasonic wave. Even after the ultrasonic wave transmitting operation of the ultrasonic oscillator is stopped, the oscillator continues to oscillate due to its mechanical inertia, that is, reverberation. Where both transmission and reception are performed by one ultrasonic oscillator by a pulse radar system and the envelope of an echo wave is detected to detect an obstacle, the echo wave cannot be distinguished from the reverberation if the echo wave is received before the reverberation disappears. Consequently, it is difficult to detect obstacles which exists in proximity, for instance, in less than about 25 cm.

In Japanese Patent Laid-Open No. 268035/1998, it is proposed that an oscillation frequency f1 different from the resonant frequency fr of a transceiver (ultrasonic sensor) is used. Detection is made with a filter that passes the frequency of $|fr-f1|$, which corresponds to a beat frequency. Where an echo wave is superimposed on reverberation, if the signal is amplified, the portion of the output from the amplifier that indicates the echo wave (reception) saturates due to excessive amplification. Specifically, the gain must be so set that even weak echo waves from distant obstacles can be detected. Therefore, saturation occurs if an echo wave from an obstacle in close proximity is received. Hence, the beat frequency $|fr-f1|$ does not appear and thus the received signal cannot be detected.

SUMMARY OF THE INVENTION

Accordingly, it is an object of the present invention to provide an ultrasonic sonar capable of detecting obstacles in proximity.

It is another object of the invention to provide a method of transmitting an ultrasonic wave from an ultrasonic sonar.

According to one aspect of the present invention, an ultrasonic oscillator transmits an ultrasonic wave. The ultrasonic wave having a frequency different from the reverberation frequency is transmitted, because the reverberation frequency is determined by the ultrasonic oscillator and the circuit constant of an associated electronic circuit and does not depend on the transmission frequency. An echo wave reflected by an obstacle is received by the ultrasonic oscillator. The signal received by the ultrasonic oscillator is converted from analog to digital form. The digital signal undergoes digital signal processing to extract only the transmission frequency component to detect the obstacle. That is, the reflected wave included in the reverberation is extracted from the received wave by digital signal processing.

According to another aspect of the present invention, an ultrasonic wave is transmitted with a given frequency. The reverberation frequency is calculated. A frequency different from the calculated reverberation frequency is set and stored in a memory. An ultrasonic wave having the frequency stored in the memory is transmitted from the ultrasonic oscillator. As a result, it is made possible to make it less susceptible to variations among individual commercial products available as sonars, that is, variations in reverberation among individual commercial products.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
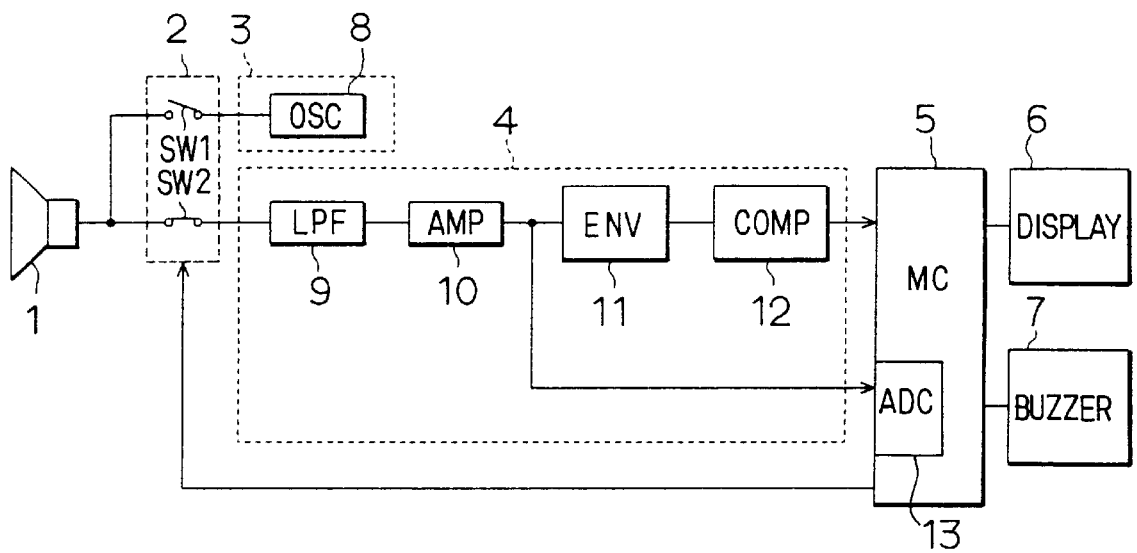
FIG. 1 is a block diagram of an ultrasonic sonar in accordance with a first embodiment of the present invention.

The present invention will be described in further detail with reference to various embodiments of the present invention. Same reference numerals are used to designate the same parts throughout the embodiments.

First Embodiment

An ultrasonic sonar shown in FIG. 1 is mounted in a vehicle and used as a back sonar or as a corner sonar. The ultrasonic sonar comprises one ultrasonic oscillator that is used to transmit and receive an ultrasonic wave to detect an obstacle by a pulse radar system.

Figure 10:
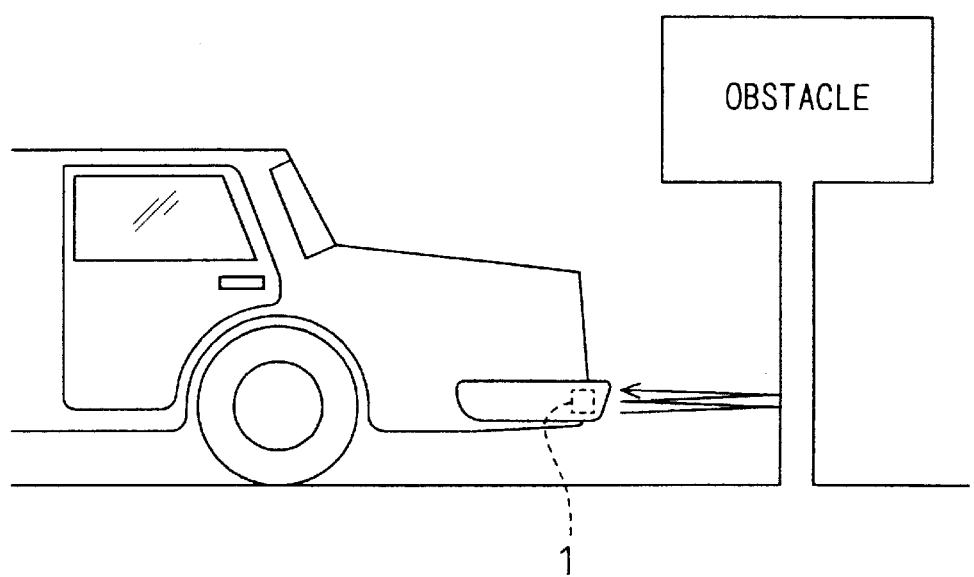
FIG. 10 is a diagram illustrating a short-range measurement in the first embodiment.

The ultrasonic sonar comprises a transceiver (ultrasonic sensor) 1, a transmission/reception switching circuit 2 including switches SW1 and SW2, a transmitting system 3, a receiving system 4, a microcomputer (MC) 5, a display device 6, and a buzzer 7. The transceiver 1 is equipped with an ultrasonic oscillator and fit at the rear or corner part in a vehicular rear bumper as shown in FIG. 10. The other parts 2–7 are placed within a vehicle compartment. The transmitting system 3 has an oscillator circuit (OSC) 8 that produces a transmission signal of 39 kHz. The receiving system 4 has a low-pass filter (LPF) 9, an amplifier circuit (AMP) 10, an envelope detection circuit (ENV) 11, and a comparator (COMP) 12. The microcomputer 5 has an A/D converter (ADC) 13.

The oscillator circuit 8 of the transmitting system 3 is connected with the transceiver 1 via the switch SW1 of the transmission/reception switching circuit 2. The transceiver 1 is connected with the low-pass filter 9 in the receiving system 4 via the switch SW2 of the transmission/reception switching circuit 2. The transceiver 1 transmits an ultrasonic wave toward the rear or corner surroundings of the vehicle in response to the signal from the oscillator circuit 8 and receives an echo wave from an obstacle. The transceiver 1 supplies a corresponding received ultrasonic signal to the low-pass filter 9. One of the switches SW1 and SW2 in the transmission/reception switching circuit 2 is closed at a time under control of the microcomputer 5. In particular, when the ultrasonic wave is transmitted, the switch SW1 of the transmission/reception switching circuit 2 is closed. When the reflected wave is received, the switch SW2 is closed.

In the receiving system 4, the low-pass filter 9 removes electrical noise superimposed on the ultrasonic signal from the transceiver 1. The output signal from the filter 9 is amplified by the amplifier circuit 10. That is, the signal responding to the received ultrasonic wave is amplified to a level at which analog to digital conversion is possible. The output signal from the amplifier circuit 10 is sent to the envelope detection circuit 11, which in turn detects the envelope. The detected envelope is compared with a given signal level by the comparator 12. The result of the comparison is sent to the microcomputer 5, and is used together with the measured reverberation time after stop of the transmission of the ultrasonic wave to confirm that no break in electrical wires has occurred.

The output signal from the amplifier circuit 10 is sent to the A/D converter 13 of the microcomputer 5. The A/D converter 13 converts its input signal into a corresponding digital signal. That is, the A/D converter 13 converts the analog output signal from the amplifier circuit 10 into the digital signal.

The microcomputer 5 performs various calculations, depending on the signal from the comparator 12 and on the digital value corresponding to the output signal from the transceiver 1, and makes a determination as to whether there is an obstacle.

If the result of the determination is that there is an obstacle near the vehicle, the microcomputer warns a vehicle driver using the display device 6 and the buzzer 7. Specifically, the distance to the obstacle is measured, and the microcomputer 5 informs the driver of the measured distance by representing the distance in terms of the interval between sound pulses or displaying the distance on the display device 6.

Figure 2:
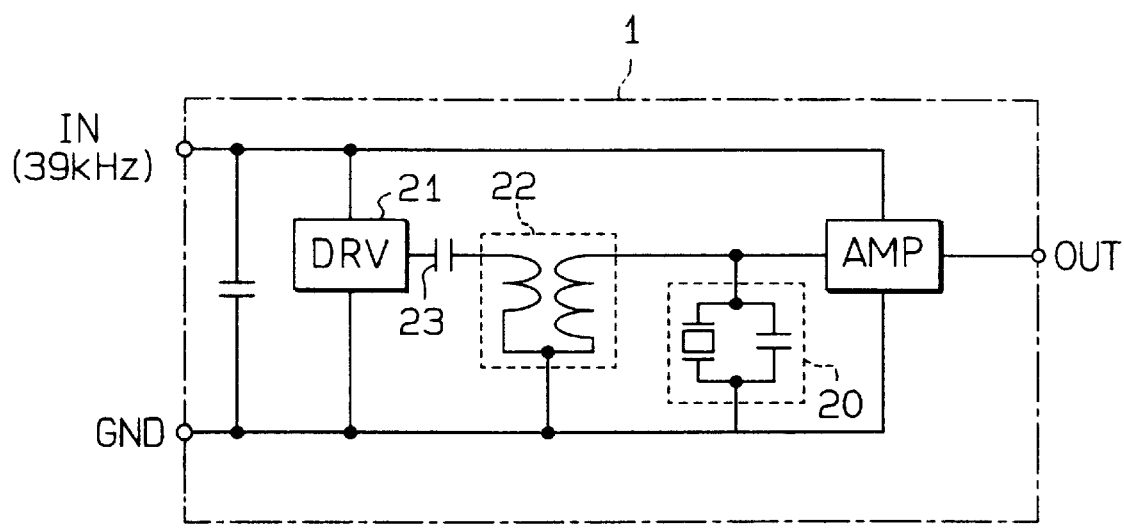
FIG. 2 is a circuit diagram of a transceiver included in the ultrasonic sonar of the first embodiment.

The circuit configuration of the transceiver 1 is shown in FIG. 2. The transceiver 1 has an ultrasonic oscillator 20 as a main component and further includes external associated circuitry made up of a driver circuit (DRV) 21, a transformer 22, and a capacitor 23. The external circuitry including the transformer 22 and the capacitor 23 operates to reduce the reverberation time to a minimum.

Figure 3:
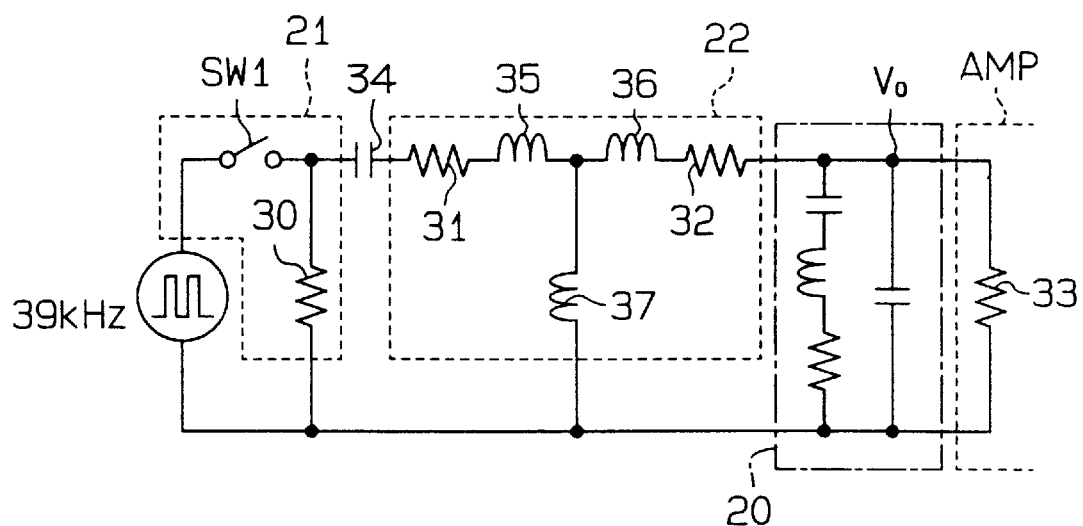
FIG. 3 is an equivalent circuit diagram of an ultrasonic oscillator and its associated circuits included in the first embodiment.

An equivalent circuit of the transceiver 1 is shown in FIG. 3 and made up of resistors 30, 31, 32, 33, a capacitor 34, and inductors 35, 36, 37. When the switch SW1 of the transmission/reception switching circuit 2 is closed, the ultrasonic oscillator 20 is activated in response to a transmission signal of 39 kHz.

The reverberation frequency and the transmission frequency are defined as follows. When a voltage $V_0$ is applied to the ultrasonic oscillator 20 shown in FIG. 3, the attenuation frequency (that is, reverberation frequency) Frev is equal to the natural frequency (resonant frequency) Fres of the whole circuit determined by the impedance of the whole circuit. The reverberation frequency Frev is independent of the frequency of the transmission signal produced from the oscillator circuit 8 and does not agree with the transmission frequency Fo as given by Frev≠Fo. Therefore, the reverberation frequency Frev is constant and independent of the transmission frequency Fo.

That is, it was found that the reverberation frequency Frev is determined by the ultrasonic oscillator 20 and the time constant of the associated circuit (that is, the impedance of the whole circuit of the transceiver 1 shown in FIG. 2) and does not depend on the transmission frequency. Based on this finding, an ultrasonic wave with a frequency different from the reverberation frequency Frev is transmitted, and the echo-wave frequency component included under the reverberation is extracted by digital signal processing (DSP). At this time, the frequency of the echo wave is equal to the transmission frequency.

Figure 4:
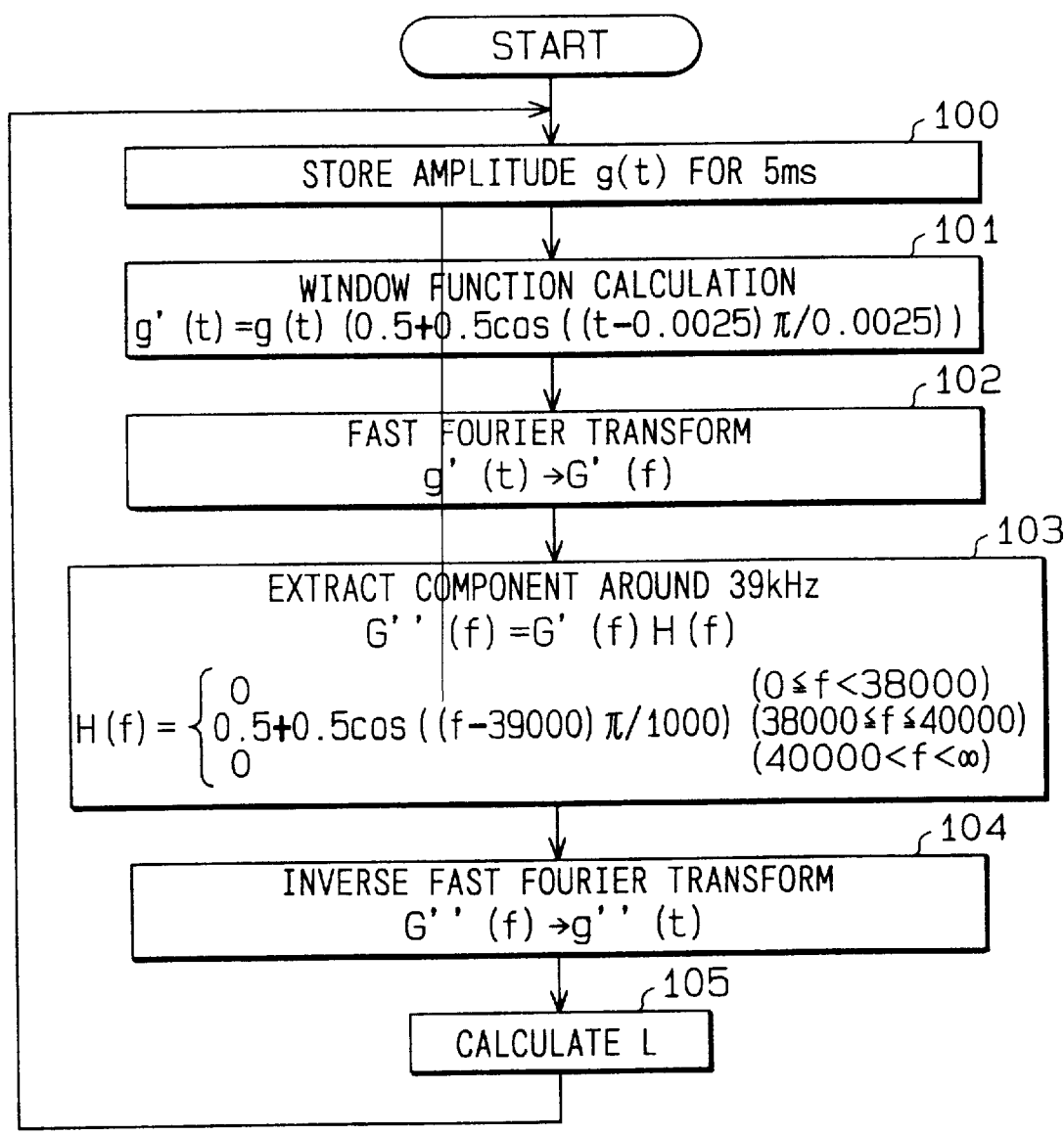
FIG. 4 is a flowchart illustrating the signal processing operation of the first embodiment.
Figure 5:
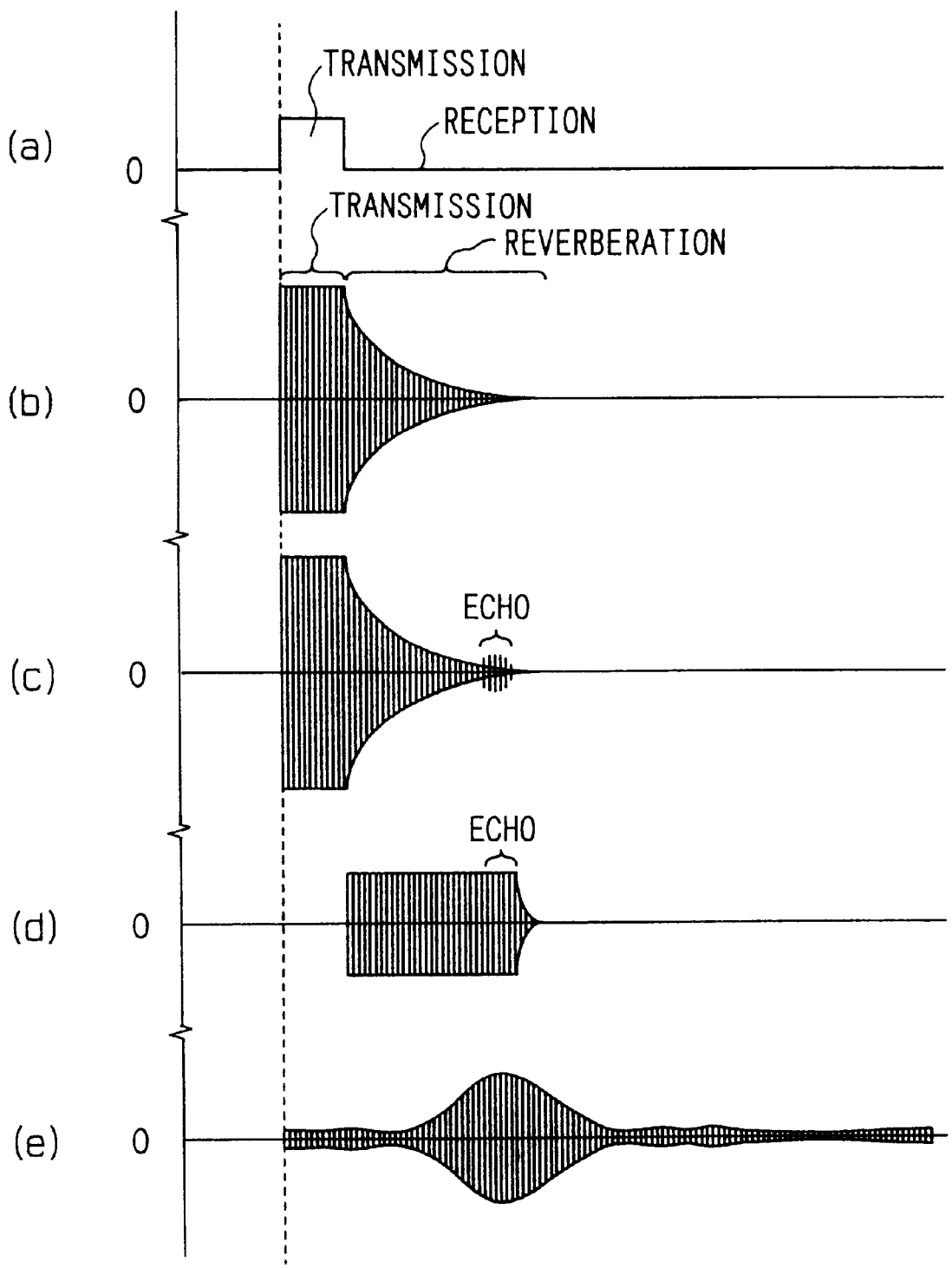
FIG. 5 is a time chart illustrating the operation of the first embodiment.
Figure 6:
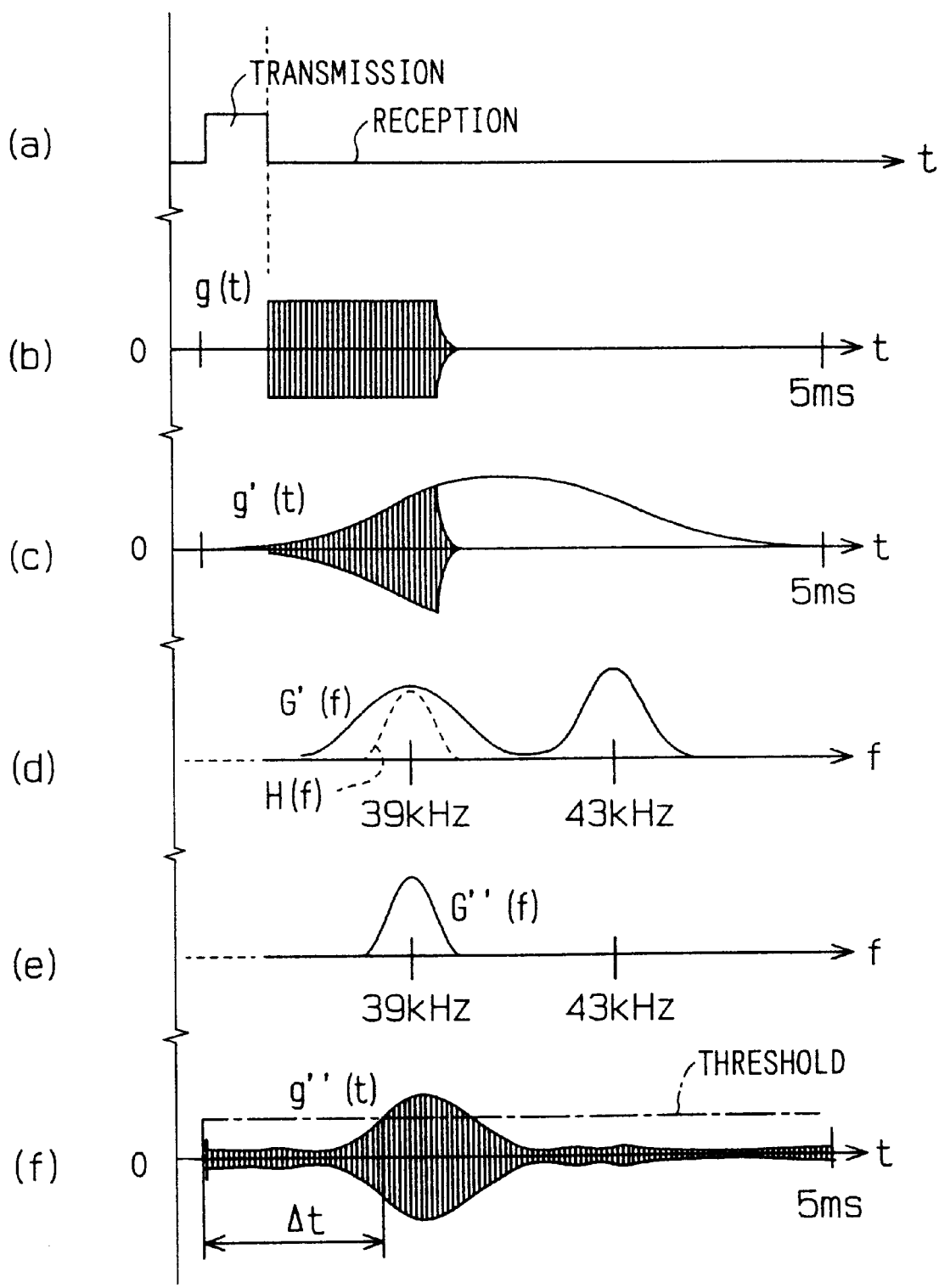
FIG. 6 is another time chart illustrating the operation of the first embodiment.

The microcomputer 5 is programmed to execute signal processing as shown in FIG. 4. FIGS. 5 and 6 show various waveforms produced in connection with this signal processing. As shown in FIG. 5, the microcomputer 5 sets the mode of operation to the transmission mode for a given time. In the transmission mode, the switch SW1 of the transmission/reception switching circuit 2 is closed. The transmission signal of 39 kHz from the oscillator circuit 8 is sent to the transceiver 1, which in turn transmits an ultrasonic wave to surroundings of the vehicle. The microcomputer 5 switches the mode of operation to the reception mode. In the reception mode, the switch SW2 of the transmission/reception switching circuit 2 is closed. An echo wave from an obstacle is received by the transceiver 1 and converted into an electric signal, which in turn is sent to the low-pass filter 9 of the receiving system 4. The reverberation frequency is 43 kHz.

Because of the characteristics of the transceiver 1, reverberation continues after the mode of operation is switched to reception. Therefore, the terminal voltage of the transceiver 1 assumes a waveform as shown by (b). The reverberation persists for a period of about 900 to 1000 $\mu$s, in which a received ultrasonic wave is transmitted for a period of about 250 $\mu$s, for example. The waveform in (b) shows a case in which there is no received ultrasonic wave (no obstacle). If there is an obstacle and an echo wave is produced from it, then a waveform changes as shown by (c).

The output signal from the transceiver 1 is passed through the low-pass filter 9 and the amplifier circuit 10. The output signal from the amplifier circuit 10 assumes a waveform as shown by (d). Under this condition, the echo wave is included within the reverberation. As shown in the enlarged diagram of FIG. 7, if there is an obstacle in proximity, reverberation shown by (b) and echo wave shown by (c) are superimposed on the received signal. Thus, the signal shown by (a) is applied from the amplifier circuit 10 to the envelope detection circuit 11. If the method of detecting the envelope of the output signal from the amplifier circuit 10 is adopted, the echo-wave cannot be detected. Accordingly, in the present embodiment, the processing illustrated in FIG. 4 is executed to extract the echo wave from the reverberation, thus detecting the obstacle, as illustrated by (e) in FIG. 5.

The signal converted into digital form by the analog-to-digital converter (ADC) 13 in this way is subjected to digital signal processing (DSP) as illustrated in FIG. 4. Referring to FIG. 4, the microcomputer 5 stores at step 100 the amplitude value g(t) in memory until a period of 5 ms passes from the start of transmission of an ultrasonic wave. This waveform produced during the period of 5 ms is shown by (b) in FIG. 6. Then, the microcomputer 5 processes the stored amplitude value g(t) produced during the period of 5 ms to obtain g'(t) using a window function at step 101. The resulting waveform is shown by (c) in FIG. 6. The microcomputer 5 converts the waveform into a frequency spectrum G'(f) by fast Fourier transform (FFT) at step 102. The resulting waveform is shown by (d) in FIG. 6.

The reverberation frequency Frev is the resonant frequency Fres, that is, 43 kHz, of the transceiver 1. The frequency of the transmission wave and hence the frequency of the received wave is 39 kHz. Therefore, if there is an echo wave from an obstacle, a component of 39 kHz appears.

The microcomputer 5 extracts the component close to 39 kHz that is the transmission frequency from the frequency spectrum G'(f) at step 103. A coefficient used for the extraction is indicated by a function H(f). In the present example, a cosine curve is used as indicated by the broken line in (d) of FIG. 6. The extracted waveform is shown by (e).

The microcomputer 5 performs an inverse fast Fourier transform (IFFT) at step 104. As a result, an echo wave appears as a waveform in the time domain as shown by (f) in FIG. 6. The microcomputer 5 measures the time $\Delta t$ between the instant when the transmission is started and the instant when the level of the echo wave from the obstacle exceeds a threshold level. It calculates the distance L to the obstacle at step 105, using the equation given by $L=0.5 \cdot \Delta t \cdot V$. Here, V is the sonic velocity. The microcomputer 5 informs the driver of the calculated distance L to the obstacle.

In the present embodiment, the ultrasonic wave of a frequency different from the natural frequency of the sonar comprising the ultrasonic oscillator and associated circuit elements is transmitted. The conventionally undetectable range such as 0 to 25 cm can be narrowed to L=0 to about 10 cm.

Although the present embodiment uses FFT and inverse FFT (IFFT), wavelet processing may alternatively be used to detect the frequency at each time. Furthermore, a digital filter or a steep analog filter may also be employed.

Figure 7:
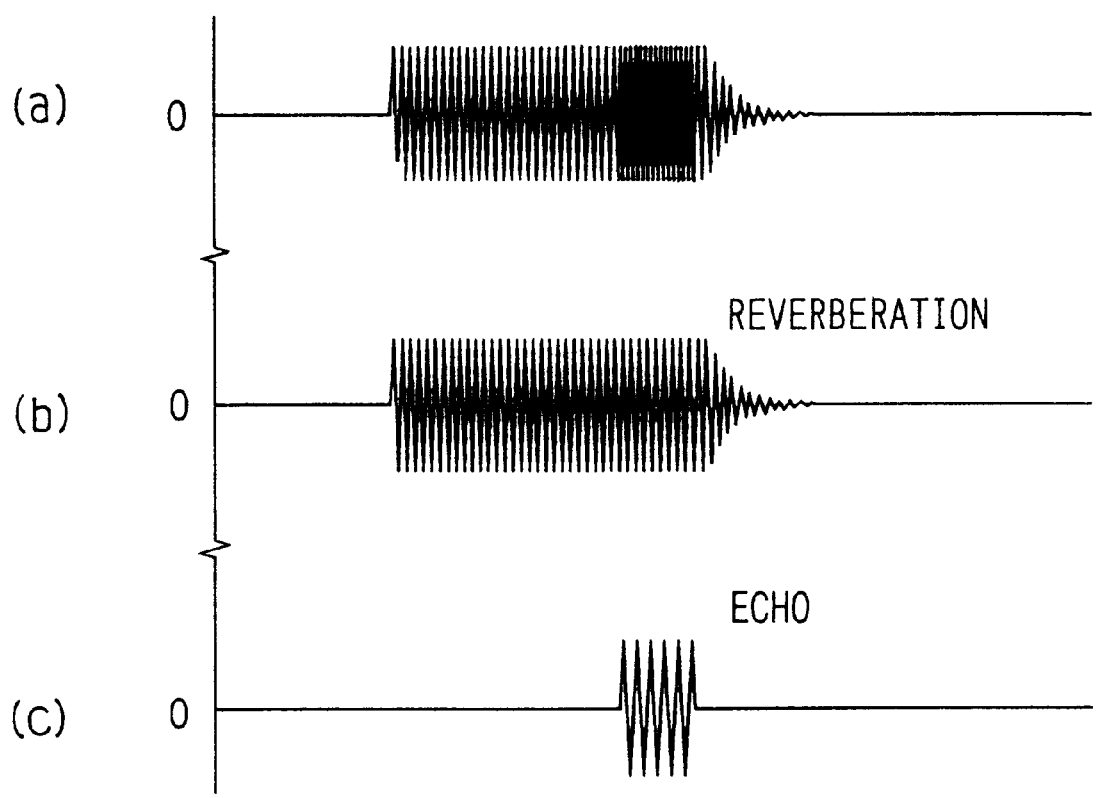
FIG. 7 is a further time chart illustrating the operation of the first embodiment.

In the case of using the wavelet processing, the frequency can be detected each time. Waveform (a) in FIG. 7 shows the input waveform to the microcomputer 5 excluding the waveform transmitted. The input is a combination of reverberation and the received wave. This input waveform is subjected to the wavelet processing, giving rise to the result shown in FIG. 8. The horizontal axis of the left portion of FIG. 8 indicates time (t), while the vertical axis indicates frequency. This left portion indicates a two-dimensional distribution of frequencies. Those portions having the same amplitude are connected by a line. It can be seen that the transmission and reception frequency distribution can be discriminated from the reverberation frequency distribution.

Figure 8:
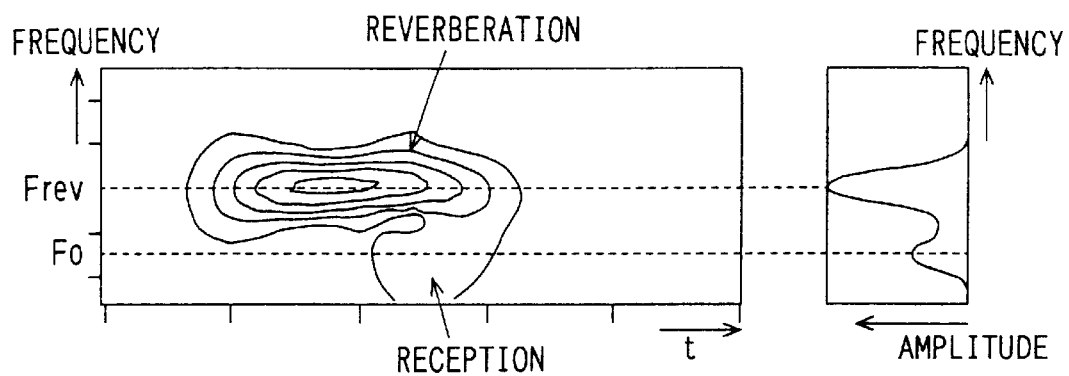
FIG. 8 is a waveform diagram illustrating wavelet transform in the first embodiment.
Figure 9:
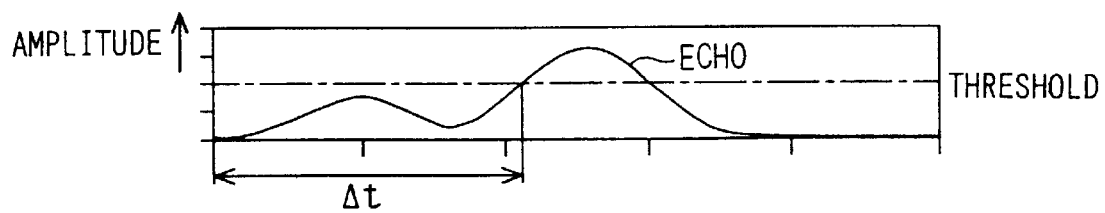
FIG. 9 is a waveform diagram illustrating wavelet transform in the first embodiment.

The right portion of FIG. 8 shows the result of fast Fourier transform (FFT) of the waveform of FIG. 7. Calculation of only the transmission frequency results in a waveform shown in FIG. 9, where the time $\Delta t$ between the instant when transmission is started and the instant when the threshold level is exceeded is measured. The distance L to the obstacle is calculated so that the distance L to the obstacle can be calculated by wavelet processing.

The first embodiment thus has the following features.

(a) An ultrasonic wave having a frequency different from the reverberation frequency is transmitted from the ultrasonic oscillator 20. When an echo wave is received, its analog signal received by the ultrasonic oscillator 20 is converted into a digital signal. This digital signal is subjected to digital signal processing to extract only the transmission frequency component. In the case of Fourier transform, a frequency transform is made, and then only the transmission frequency component is extracted. Then, an inverse transform is made. Therefore, an obstacle in proximity can be detected.

(b) The distance L to an obstacle is calculated from the time $\Delta t$ between the instant when the transmitting is started and the instant when the level of the echo wave from the obstacle exceeds a threshold level.

Second Embodiment

The second embodiment is constructed to detect an obstacle at a distance of less than about 10 cm, while the first embodiment is constructed to detect an obstacle at a distance of, for instance, 10 cm to 25 cm).

Figure 11:
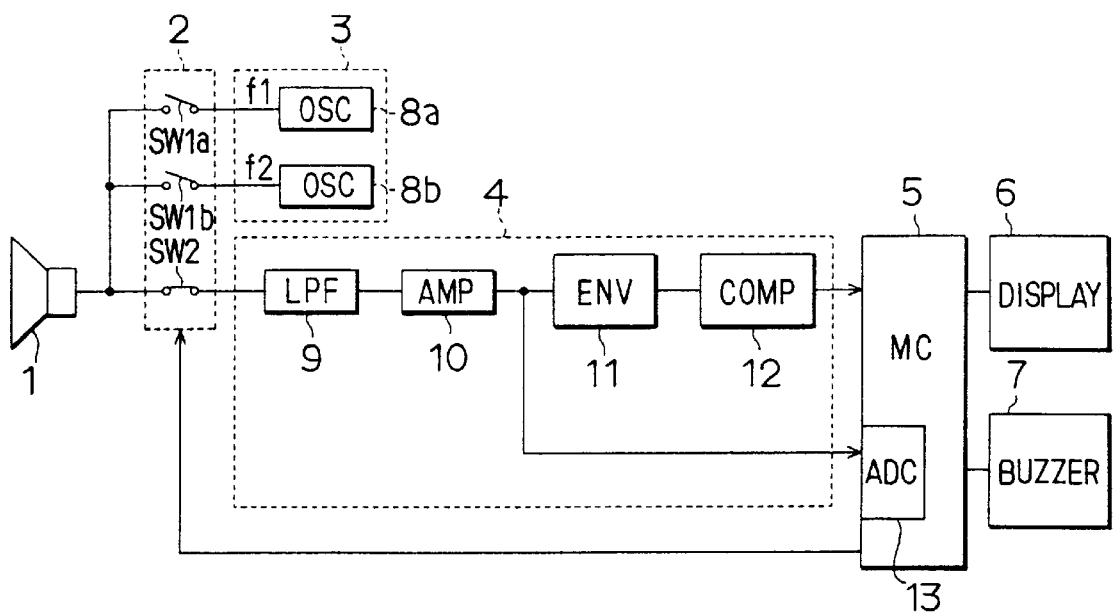
FIG. 11 is a block diagram of an ultrasonic sonar in accordance with a second embodiment of the present invention.

In this embodiment, as shown in FIG. 11, the ultrasonic sonar is different from the first embodiment in its transmitting system 3 and the switching circuit 2. The transmitting system 3 has two oscillator circuits (OSCS) 8a and 8b that produce transmission signals having different frequencies f1 and f2, respectively. In particular, the oscillator circuit 8a produces a signal of 39 kHz (=f1). The oscillator circuit 8b produces a signal of 35 kHz (=f2). The oscillator circuit 8a is connected with the transceiver 1 via a switch SW1a, while the oscillator circuit 8b is connected with the transceiver 1 via a switch SW1b. These switches SW1a and SW1b are opened and closed by the microcomputer 5. This microcomputer 5 receives the output signal from the receiving system 4, converts the analog signal into the digital signal, and performs frequency analysis by wavelet processing as shown in FIG. 12.

Figure 13:
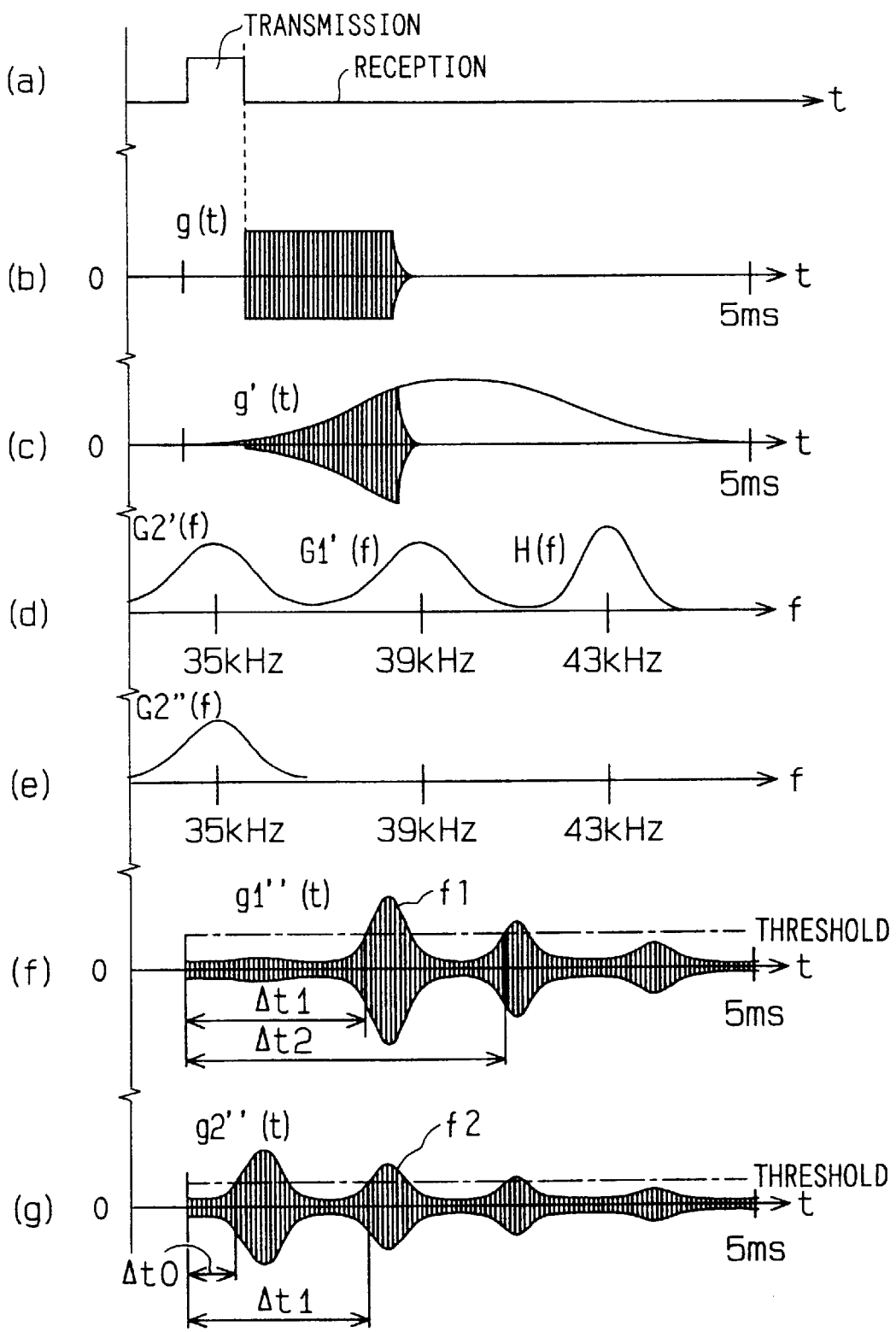
FIG. 13 is a time chart illustrating the operation of the second embodiment.

The transmission frequency is switched between the frequencies f1 and f2. The frequency analysis is made by wavelet analysis, FFT or IFFT. However, the received waveform obtained after separation from reverberation differs according to modification of the transmission frequency. (f) in FIG. 13 shows the received waveform obtained after separation of the reverberation frequency (=43 kHz) when the transmission frequency f1 is 39 kHz. (g) in FIG. 13 shows a waveform obtained when the transmission frequency is varied from f1 to f2 (=35 kHz). That is, the transmission frequency f2 (=35 kHz) is more differentiated from the reverberation frequency (=43 kHz) than the transmission frequency f1 (=39 kHz).

Measurements of distances using the send frequencies f1 and f2 have the following advantages and disadvantages. Use of the transmission frequency f1 (=39 kHz) closer to the natural frequency (reverberation frequency) is desirable from a viewpoint of resonance. That is, the level of the echo wave can be enhanced. Use of the second frequency f2 (=35 kHz) more differentiated from the reverberation frequency is desirable from a viewpoint of separation of the frequency component to be extracted. That is, if the transmission frequency is set to f1 (=39 kHz) as shown by (f), the reverberation level is high at short distances. Therefore, at a quite short distance of less than 10 cm, it is difficult to discriminate the reverberation from the received wave. This received wave does not appear as an output signal. In consequence, the output signal starts to appear at a distance of about 10 cm. The threshold level is exceeded after times $\Delta t1$ and $\Delta t2$. where the transmission frequency is switched from f1 to f2 as shown by (g) and the difference from the reverberation frequency is increased, it is easier to separate the echo wave. However, the pressure of the sonic wave transmitted drops. Therefore, the voltage of the reflected wave decreases. Obstacles at longer distances cannot be detected, but obstacles in proximity can be detected. Therefore, a waveform exceeding the threshold level appears after times $\Delta t0$ and $\Delta t1$.

Figure 12:
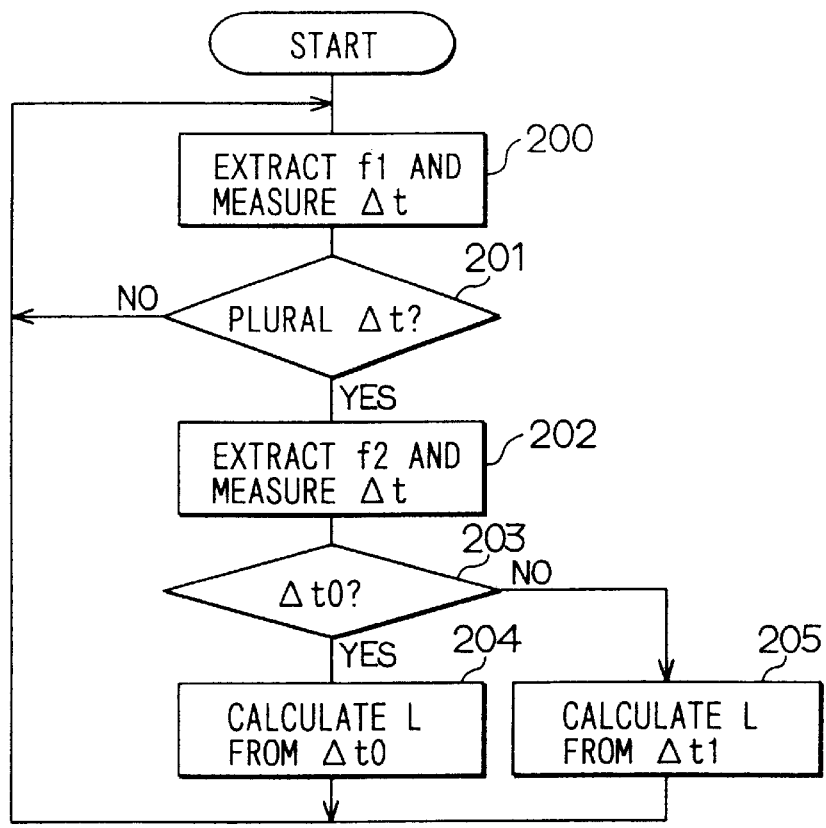
FIG. 12 is a flowchart illustrating the signal processing operation of the second embodiment.
Figure 14:
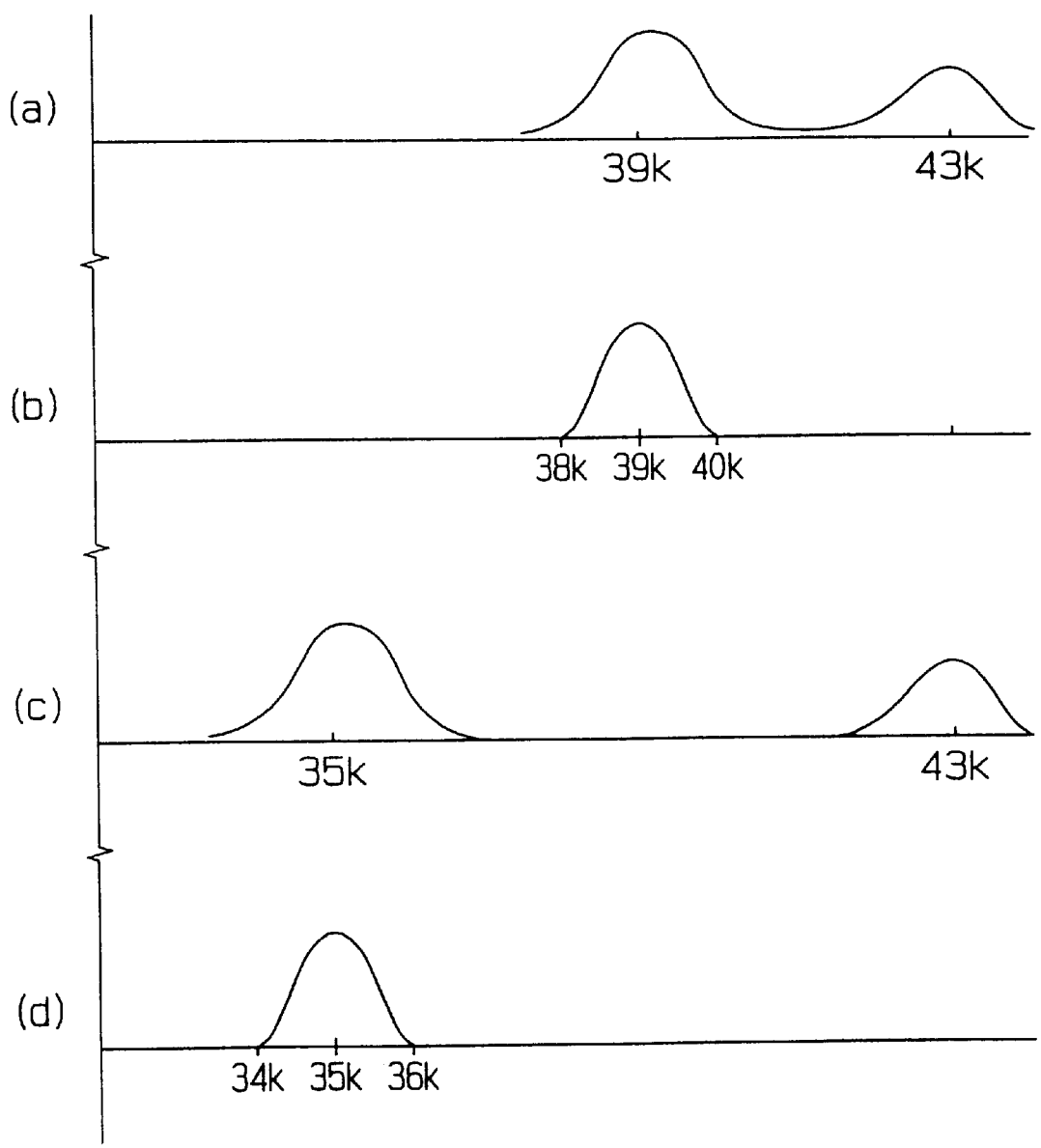
FIG. 14 is another time chart illustrating the operation of the second embodiment.

Referring to FIG. 12, the microcomputer 5 performs a wavelet transform, FFT or IFFT at the transmission frequency f1 to extract the transmission frequency (reception frequency) at step 200. The frequency component prior to the extraction of the transmission frequency (reception frequency) is shown by (a) in FIG. 14. This changes to the form shown by (b) in FIG. 14. Then, the microcomputer 5 compares it with the threshold level as shown by (f) in FIG. 13 and determines at step 201 as to whether there are plural times $\Delta t$, that is, whether plural echo waves in excess of the threshold level are received. If there are $\Delta t1$ and $\Delta t2$ as shown by (f) in FIG. 13, for example, the microcomputer 5 estimates that there is an obstacle and there is a possibility that the ultrasonic wave is reflected plural times between the transceiver 1 and the obstacle.

Furthermore, the microcomputer 5 performs at step 202 a short-range detection by setting the transmission frequency to f2 to check if there is an obstacle in close proximity (less than 10 cm). In particular, a wavelet transform (frequency analysis) is performed at the transmission frequency f2. The frequency component obtained prior to the extraction of the transmission frequency (reception frequency) is shown by (c) in FIG. 14. This changes to the form as shown by (d) in FIG. 14. The microcomputer 5 compares the obtained value with the threshold level as shown by (g) in FIG. 13 and determines at step 203 as to whether there is $\Delta t0$ less than $\Delta t1$. If there is no $\Delta t0$, the microcomputer 5 determines that there is no obstacle in proximity and calculates the distance L from $\Delta t1$ at step 205. If there is $\Delta t0$, the microcomputer 5 determines that there is an obstacle in proximity and computes the distance L from $\Delta t0$ at step 204.

If the microcomputer determines that there is an obstacle at a distance of 10 to 50 cm, that is, a received waveform appears after time corresponding to 10 to 50 cm, the transmission frequency is switched to the frequency more differentiated from the reverberation frequency. In this way, detection of an obstacle at a quite short distance of less than 10 cm can be performed.

The second embodiment has the following features.

An obstacle is detected with the first transmission frequency f1. If an obstacle is detected within the first short distance, the transmission frequency is switched to the second frequency f2 more differentiated from the reverberation frequency and the echo wave can be separated easily so that accurate detection of an obstacle is enabled.

Third Embodiment

The third embodiment is constructed to precisely separate the reception frequency from the reverberation for the following reasons. That is, individual commercial products available as sonars differ in reverberation frequency due to variations in resonant frequency of transceiver itself, variations in electric circuit associated to the transceiver, and attached jigs. Therefore, the reverberation frequency may not be separated from the reception frequency precisely. If the transmission frequency is differentiated greatly from the reverberation frequency (resonant frequency), a great deviation from the resonance point occurs. This will make the transceiver sensor useless.

Figure 15:
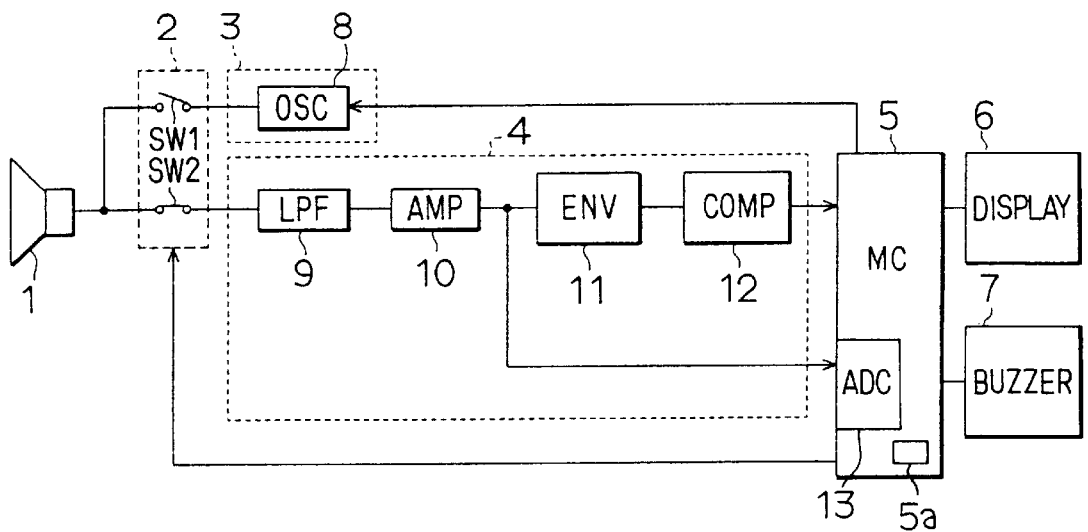
FIG. 15 is a block diagram of an ultrasonic sonar in accordance with a third embodiment of the present invention.

In the third embodiment, as shown in FIG. 15, the microcomputer 5 is equipped with a nonvolatile memory 5a for storing therein the transmission frequency different from the reverberation frequency. An ultrasonic oscillator capable of adjusting the transmission frequency can be used in the present embodiment. Specifically, the frequency of the signal sent to the transceiver 1 from the oscillator circuit 8 can be adjusted.

Figure 16:
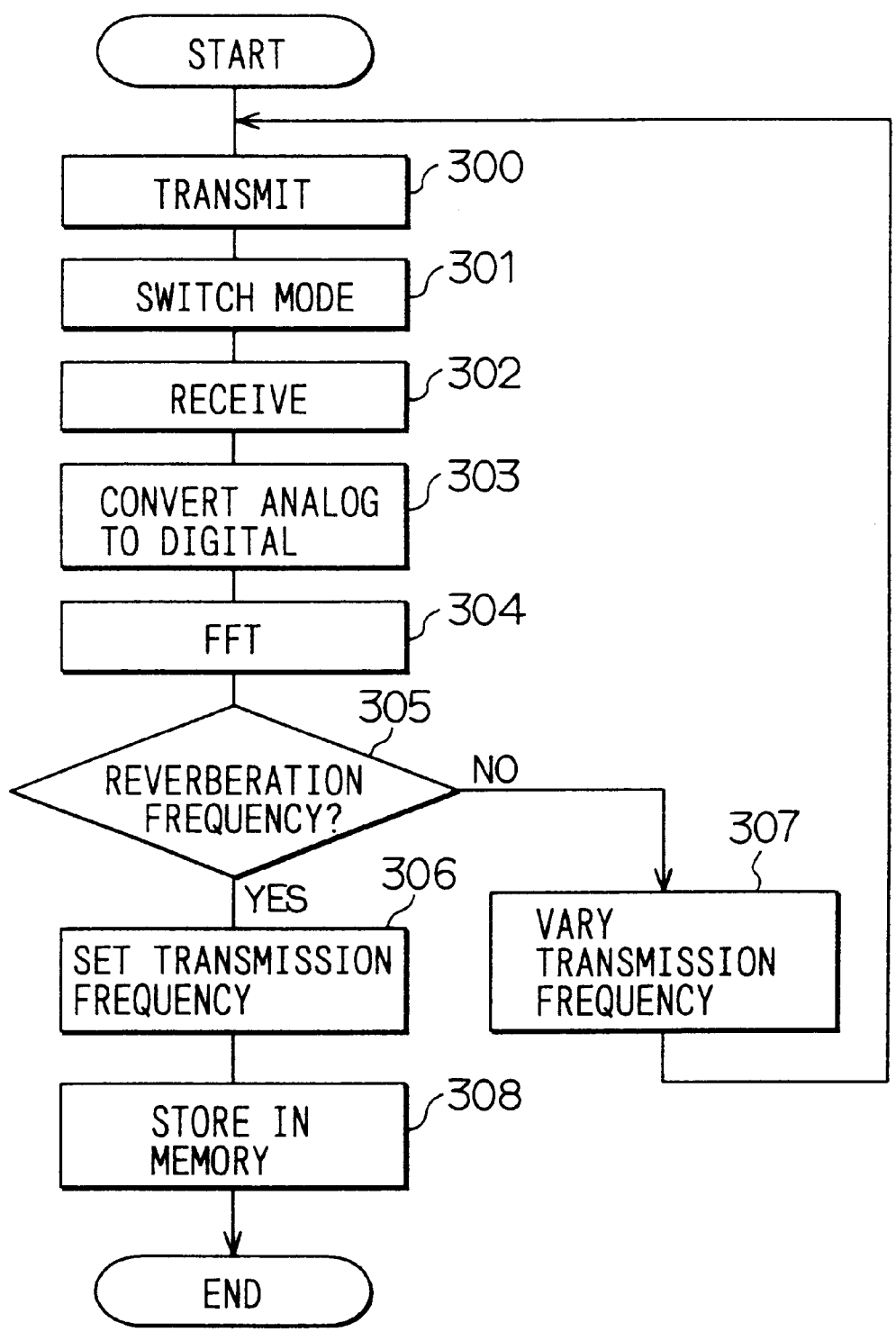
FIG. 16 is a flowchart illustrating the signal processing operation of the third embodiment.

The microcomputer 5 is programmed to perform signal processing as shown in FIG. 16, when the transceiver (ultrasonic sensor) 1 is mounted on a vehicle at vehicle manufacturing or sonar installation sites. When an obstacle is placed to face the transceiver 1, the microcomputer 5 causes the transceiver 1 to transmit an ultrasonic wave of 40 kHz in a quite short time of 250 $\mu$sec, for example, at step 300. The microcomputer 5 switches the mode of operation from transmission to reception at step 301. Then, the microcomputer 5 causes the transceiver 1 to receive an ultrasonic wave (echo wave) reflected from the obstacle at step 302.

Figure 17:
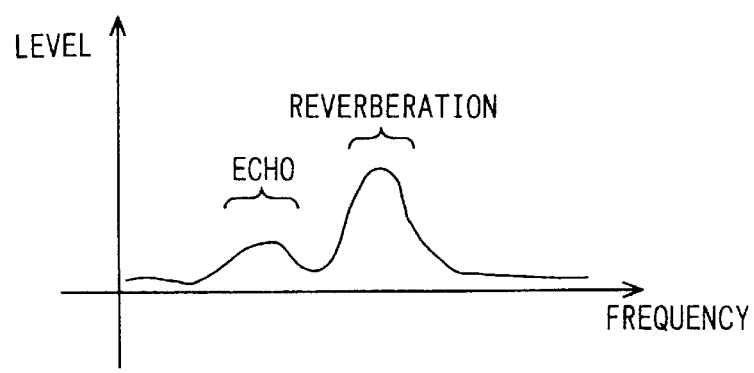
FIG. 17 is a waveform diagram of a waveform obtained when reverberation is found in the third embodiment.
Figure 18:
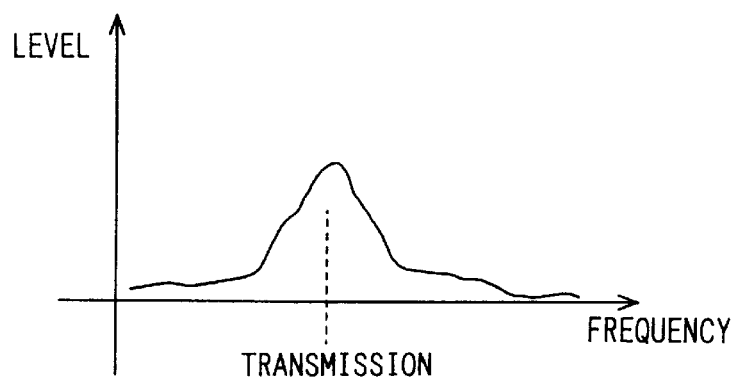
FIG. 18 is a waveform diagram in which reverberation and the transmission frequency are close to each other in the third embodiment.

The microcomputer 5 converts the analog output signal from the transceiver 1 into a digital signal at step 303 and performs a fast Fourier transform (FFT) to convert the signal from the time domain to the frequency domain at step 304. The microcomputer 5 determines at step 305 whether the reverberation-frequency component (peak) other than the echo component (transmission frequency component) can be found as shown in FIG. 17. If so, the microcomputer 5 sets the transmission frequency at step 306. On the other hand, if the transmission frequency and the reverberation frequency are close to each other and any peak other than the transmission frequency component cannot be detected, that is, the reverberation frequency cannot be found, as shown in FIG. 18, the microcomputer 5 executes step 307, where the transmission frequency is varied by 1 kHz, for example. Then, the steps 300–305 are carried out again. If the transmission frequency is determined at step 306, the microcomputer 5 stores the determined transmission frequency in the nonvolatile memory 5a at step 308.

After shipment from the manufacturing or installation site, the microcomputer 5 performs the processing similar to the first embodiment as illustrated in FIG. 4. Specifically, the microcomputer 5 causes the transceiver 1 to transmit an ultrasonic wave with the transmission frequency stored in the nonvolatile memory 5a. An ultrasonic wave having the frequency stored in the nonvolatile memory 5a is transmitted. only the echo component from an obstacle is extracted. The signal is transformed from the frequency domain to the time domain (inverse fast Fourier transform (IFFT). The distance to the obstacle is measured from the time at which a certain threshold level is exceeded. The sonar warns the driver according to the distance to the obstacle.

The third embodiment has the following features.

(a) The sonar is equipped with the memory 5a which stores a transmission frequency different from the reverberation frequency. An ultrasonic wave with the transmission frequency stored in the memory 5a is transmitted from the ultrasonic oscillator. That is, the reverberation frequency is determined uniquely for each individual sonar. To eliminate variations among the individual commercial products, after the sonar is installed in a desired location, the transmission frequency is measured and stored in the nonvolatile memory 5a. This precisely eliminates the effects of reverberation.

(b) The transmission frequency stored in the memory 5a is set according to the reverberation frequency.

(c) As a method of transmitting an ultrasonic wave from the ultrasonic sonar, the transmission frequency is determined and stored in the memory 5a for each vehicle. Therefore, the sonar is relatively less susceptible to variations in reverberation among individual commercial products available as sonars.

Fourth Embodiment

In the fourth embodiment also, the frequency domain of the transmission (reception) frequency component is extracted by frequency analysis (FFT) to eliminate the effects of reverberation as in the first embodiment. If all the data is converted from the time domain to the frequency domain, the effect of reverberation component is great and determination of the correct received wave may be hindered. Therefore, the present embodiment is constructed to avoid this.

Figure 19:
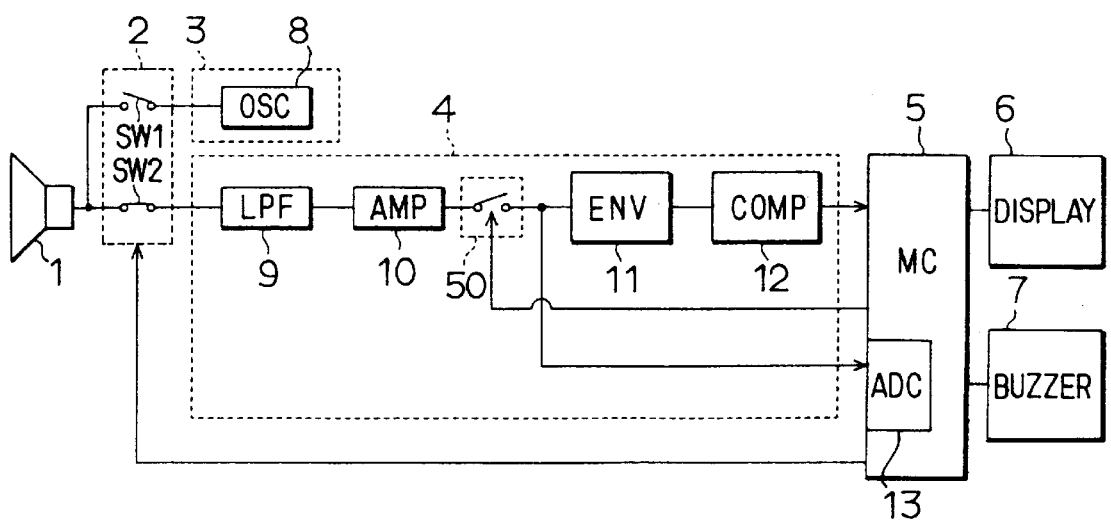
FIG. 19 is a block diagram of an ultrasonic sonar in accordance with a fourth embodiment of the present invention.
Figure 20:
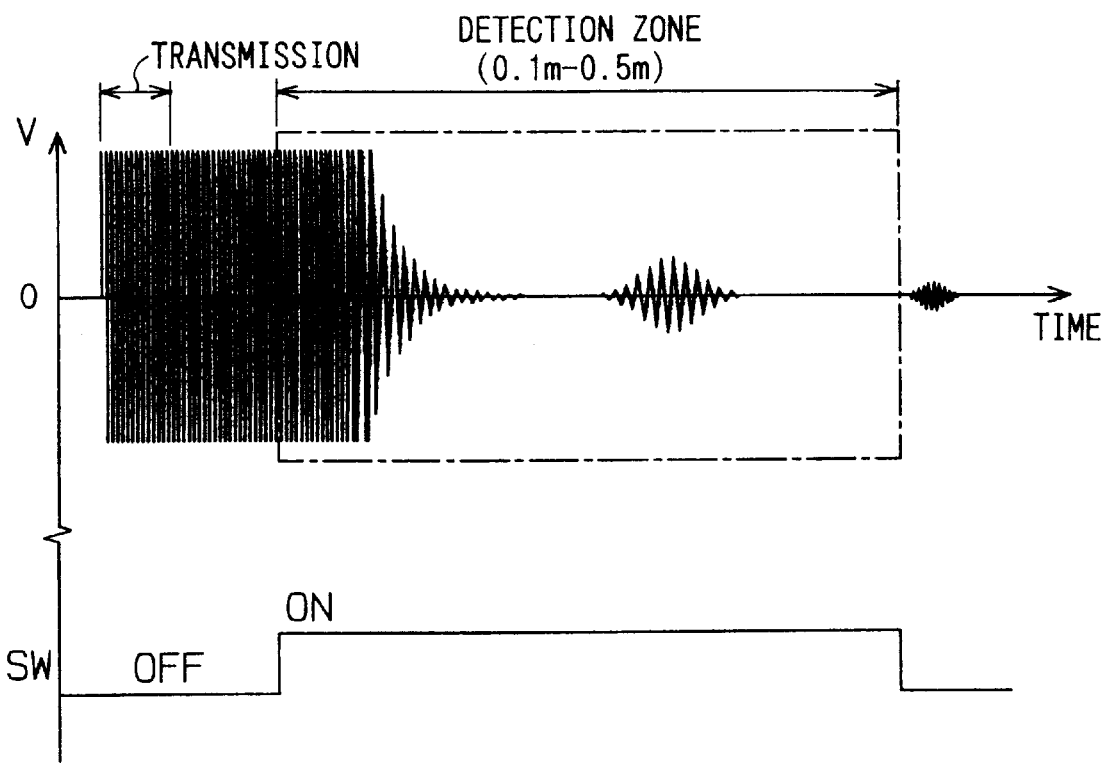
FIG. 20 is a time chart illustrating the operation of the fourth embodiment.

As shown in FIG. 19, a switch 50 is placed between the amplifier circuit 10 and the envelope detection circuit 11. This switch 50 is made of a transistor, for example, and opened and closed by the microcomputer 5. FIG. 20 is a time chart showing the output waveform (output signal from the transceiver 1) of the amplifier circuit 10 shown in FIG. 19, as well as the state (ON or OFF) of the switch 50.

During the transmission of an ultrasonic signal, the microcomputer 5 opens the switch 50. When a masking period has passed, the microcomputer 5 closes the switch 50 to accept the received signal. That is, the switch 50 is closed only during a period corresponding to the necessary detection zone (10 cm–50 cm). Other zones are excluded. Reverberation is produced immediately after stop of the transmission. During a quite short interval corresponding to 0 to 10 cm after the stopping of the transmission, the measurement is not made. Therefore, this time interval is eliminated before conversion from the time domain to the frequency domain.

Figure 21:
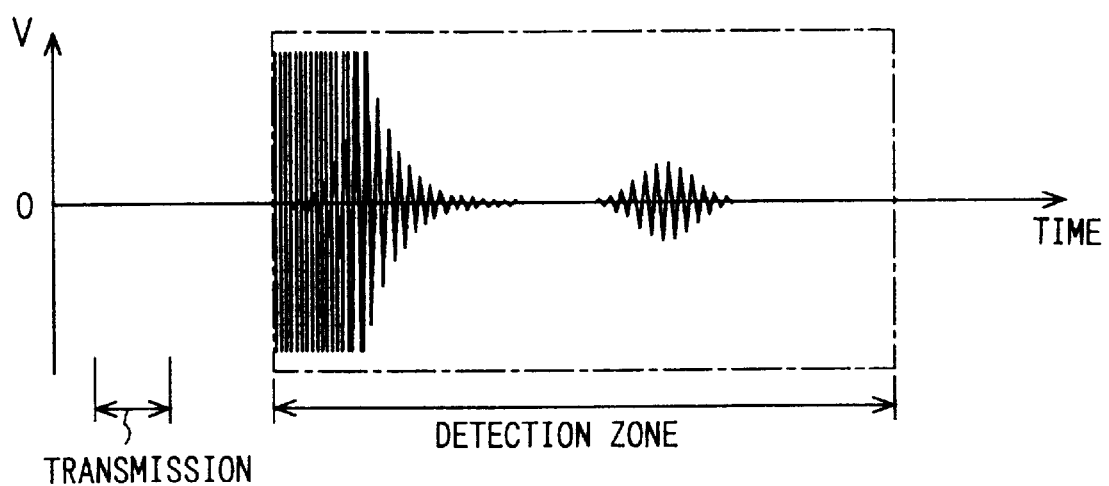
FIG. 21 is another time chart illustrating the operation of the fourth embodiment.
Figure 22:
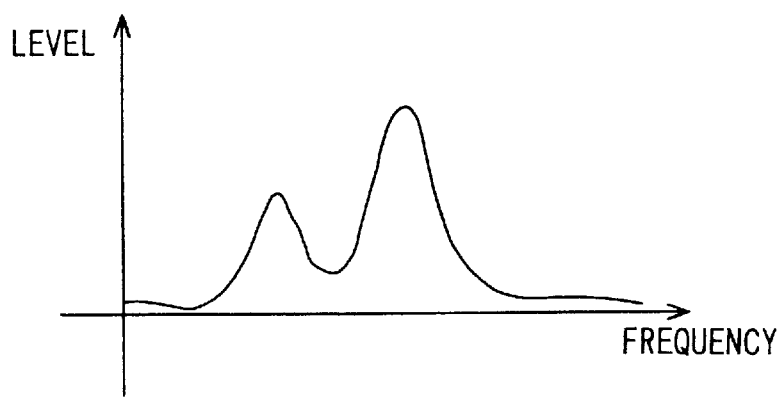
FIG. 22 is a waveform diagram illustrating the operation of the fourth embodiment.
Figure 23:
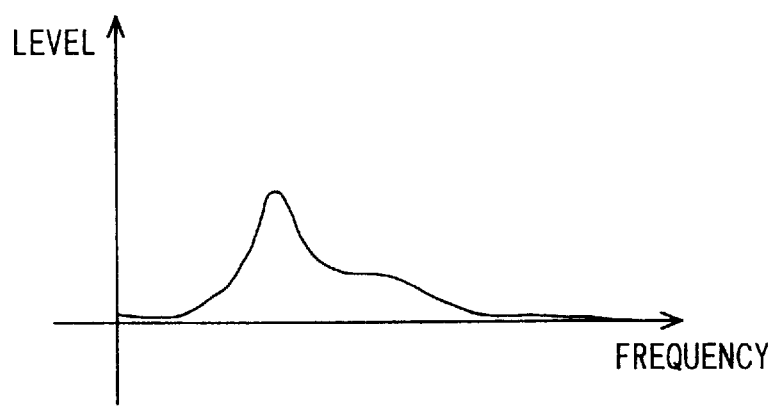
FIG. 23 is another waveform diagram illustrating the operation of the fourth embodiment.
Figure 24:
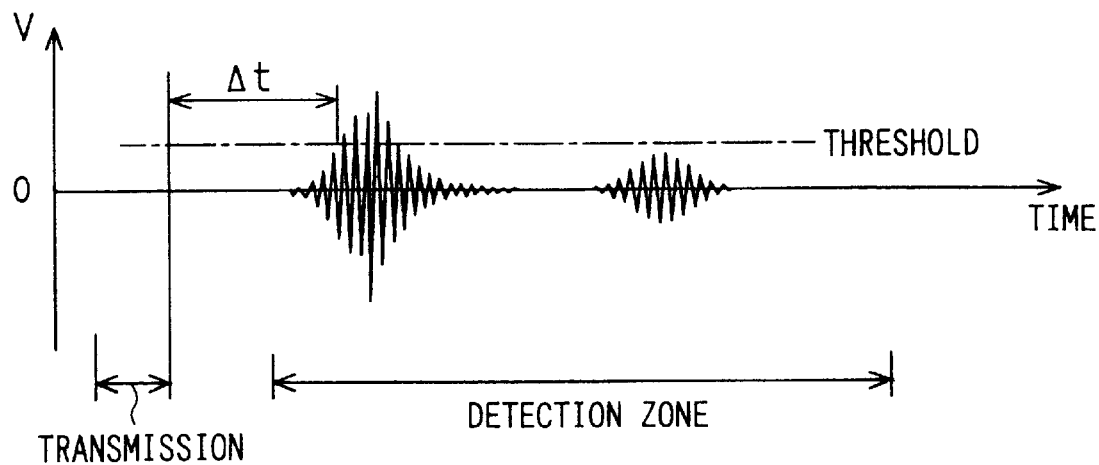
FIG. 24 is a further waveform diagram illustrating the operation of the fourth embodiment.

As a result, analog to digital conversion is made and FFT is performed only when the switch 50 is closed as shown in FIG. 21. The results of the FFT are shown in FIG. 22. The reverberation-frequency component is eliminated, and only the transmission frequency component is extracted. The results are shown in FIG. 23. The obtained data is subjected to inverse FFT, giving rise to a waveform shown in FIG. 24. As a consequence, an echo wave from an obstacle can be correctly extracted. Thus, it is only necessary to perform a digitization only within the necessary detection range. Hence, the digital signal processing load of the microcomputer 5 can be reduced. Instead of the time-frequency transformation using FFT, wavelet procedures may also be used.

The fourth embodiment has the following features.

(a) The ultrasonic oscillator is designed to reject the received signal from the end of transmission of an ultrasonic wave to the instant when a reflected ultrasonic wave arrives from a detection zone in which an obstacle to be detected exists. Therefore, when the signal is converted from the time domain to the frequency domain, the reverberation-frequency component drops relatively. Consequently, the sonar can be made more immune to the effects of reverberation.

(b) Before the received signal is converted from analog to digital form, the ultrasonic oscillator rejects the received signal.

The present invention should not be limited to the disclosed embodiments, but may be implemented in many other ways without departing from the spirit of the invention.

What is claimed is:

1. An ultrasonic sonar for detecting an obstacle comprising:
    an ultrasonic oscillator for transmitting an ultrasonic wave and receiving an ultrasonic wave reflected from the obstacle, the ultrasonic oscillator having a reverberation frequency; and
    processing means for causing the ultrasonic oscillator to transmit the ultrasonic wave at a transmission frequency different from the reverberation frequency, converting an analog signal received by the ultrasonic oscillator into a digital signal on detection of the obstacle, and extracting only a component of the transmission frequency from the converted signal by digital signal processing.

2. The ultrasonic sonar of claim 1, wherein:
    the processing means calculates a distance to the obstacle from a period of time between a start of transmission of the ultrasonic wave and an instant when level of the ultrasonic wave of the transmission frequency extracted by the digital signal processing exceeds a threshold level.

3. The ultrasonic sonar of claim 1, wherein:
    the transmission frequency is switched from a first transmission frequency to a second transmission frequency that is more differentiated from the reverberation frequency than the first transmission frequency, if presence of an obstacle within a predetermined distance is detected by using the first transmission frequency.

4. The ultrasonic sonar of claim 1, further comprising:

a memory for storing a transmission frequency different from the reverberation frequency, wherein the ultrasonic wave is transmitted from the ultrasonic oscillator at the transmission frequency stored in the memory.

5. The ultrasonic sonar of claim 4, wherein:

the transmission frequency stored in the memory is set according to the reverberation frequency.

6. The ultrasonic sonar of claim 1, wherein:

the signal received by the ultrasonic oscillator is rejected during a period between end of transmission of the ultrasonic wave and arrival of the ultrasonic wave reflected within a predetermined zone.

7. The ultrasonic sonar of claim 6, wherein:

the signal received by the ultrasonic oscillator during the period is rejected before the signal is converted from analog to digital form.

8. A method of transmitting an ultrasonic wave from an ultrasonic oscillator included in an ultrasonic sonar and for receiving an ultrasonic wave reflected from an obstacle by the ultrasonic oscillator to detect an obstacle, the method comprising the steps of:

causing the ultrasonic oscillator to transmit an ultrasonic wave with a given frequency;

calculating a reverberation frequency;

setting a transmission frequency to a frequency different from the calculated reverberation frequency and storing the set transmission frequency in a memory;

causing the ultrasonic oscillator to transmit the ultrasonic wave of the frequency stored in the memory;

converting an analog signal received by the ultrasonic oscillator to a digital signal; and calculating a distance to an obstacle, by which the ultrasonic wave is reflected, based on the digital signal by using a fast Fourier Transform and an inverse fast Fourier Transform.

9. The method of claim 8, wherein the calculating a distance to an obstacle further comprises:

extracting only a component of the transmission frequency corresponding to the distance to the obstacle; and using the extracted component in the calculating of the distance.

10. The method of claim 8, wherein the setting of the transmission frequency includes switching the transmission frequency from a first transmission frequency to a second transmission frequency that is further differentiated from the reverberation frequency than the first transmission frequency, if a presence of the obstacle within a predetermined distance is detected by using the first transmission frequency.

11. The method of claim 9, wherein the calculating a distance of an obstacle includes calculating the distance to the obstacle from a period of time between a start of transmission of the ultrasonic wave and an instant when a signal level of the component of the transmission frequency resulting from the extracting of only a component of the transmission frequency corresponding to the distance to the obstacle exceeds a threshold level.

12. The method of claim 10, further comprising;

rejecting signals received by the ultrasonic oscillator during a period between an end of transmission of the ultrasonic wave and an arrival of the ultrasonic wave reflected within a predetermined zone.

13. The method of claim 10, further comprising;

rejecting signals received by the ultrasonic oscillator before the converting of an analog signal received by the ultrasonic oscillator to a digital signal.

14. The ultrasonic sensor of claim 1, wherein the processing means calculates a distance to the obstacle by using a fast Fourier Transform and an inverse fast Fourier transform.

* * * * *